3,849,583
METHOD OF PRODUCING A FONDANT PRODUCT
Andreas Marinus Aartsen, Barendrecht, Netherlands, assignor to Cooperatieve Vereniging Suiker Unie U.A., Rotterdam, Netherlands
No Drawing. Filed June 19, 1972, Ser. No. 263,947
Claims priority, application Netherlands, June 21, 1971, 7108468
Int. Cl. A23g 3/00
U.S. Cl. 426—162                    8 Claims

ABSTRACT OF THE DISCLOSURE

Method of producing a dry freeze-thaw stable glaze mix by blending dry granular fondant sugar with a liquid mixture of palm kernel fat and safflower oil.

---

This invention relates to the production of fondant products that may be used in pastry shops, confectionery works and the like.

It is known to use fondant in the form of a wet paste and to convert this paste to a sugar glaze by icing. The fondant paste may be prepared by cooking a sugar solution until saturated and then crystallising part of the sugar therein by means of cooling and agitation. After an ageing treatment of 24 hours or more, the resulting product is utilisable as a fondant paste.

A fondant paste is a wet product of putty-like consistency with the result that it cannot easily be stored or handled. Therefore, there have already been many efforts to find a dry granular fondant product that may be stored for an indefinite period and that may be converted at any time to a fondant paste suitable for utilisation by simply mixing it with a certain amount of liquid.

A dry fondant product satisfying these requirements has been disclosed in Belgian Pat. No. 548,498. It is prepared from a sugar solution which comprises difficultly crystallisable sugars (obtained e.g. by partial inversion of sucrose) and by means of the following method: first concentrating the sugar solution by cooking to reach a solids content of 90–95%, then admixing to the concentrated solution an amount of 30 to 70% (calculated on total mixture) of finely divided sugar particles having for the major part a size not exceeding 40 microns, then breaking and cooling the mixture, and drying it during mixing, breaking and cooling to reach a moisture content of about 2% by weight.

A dry fondant product or fondant sugar resulting from this method or obtained in another way will satisfy high standards because it can be stored for a long time in dry condition and may be converted easily to a wet fondant paste by adding liquid to it, whereupon the fondant paste may be used to prepare sugar glazes of good lustre. Nevertheless, the dry products may be improved. In pastry shops e.g., it is more and more conventional to store the pastry products during weekends and the like in refrigerators at temperatures of about −18° to −20° C. Thanks to this freezing treatment, quality losses of the products are prevented and the pastry products may be offered for sale after thawing without any objections. However, a difficulty is that a normal sugar glaze will not be able to stand the freezing and thawing treatments without flowing away during thawing. This applies to sugar glazes made from freshly cooked fondant pastes as well as to sugar glazes made from a dry fondant sugar mixed with liquid. Therefore, there is a need for improved dry fondant products capable of giving sugar glazes that are stable against freezing and thawing operations.

In accordance with the invention, it has now been found that this need may be satisfied by blending a dry, granular fondant sugar with 5–10% of emulsifiable fat (calculated on the weight of fondant sugar). The resulting product is still dry and granular and may be stored for long periods in that condition. Moreover, it may be mixed with liquid to form a fondant paste of good consistency. Besides, it has the property that a sugar glaze made from the fondant paste will not flow away when subjected to freezing and thawing treatments. Therefore, the product of the invention is utilisable under all conditions in the pastry shop. The added fat phase need not have any noticeable influence to the test of the glaze, thanks to the small proportion in which it is used.

The starting material for making the invented product may be any dry, granular fondant sugar as prepared in accordance with prior art methods. This material will normally comprise 70 to 95% of saccharose, together with 3 to 28% of invert sugars and 2% of moisture. However, the invention is not restricted to such a composition of the fondant sugar and other compositions may be used instead, provided that the fondant sugar is dry and granular and will satisfy the requirements of a good fondant product.

This fondant sugar is blended with an emulsifiable fat. In most cases, the fat will be a combination of a hard fat with a liquid oil, such as a combination of palm kernel fat with sunflower oil, together with a conventional emulsifier such as a saccharidic ester.

The melting point of the emulsifiable fat should be between 20° and 40° C. in order to ensure good storability and processability on the one hand and good consumability on the other hand. Such fat mixtures may comprise several different components and may easily be adapted to the requirements of the user.

In order to reach a good blend of the dry, granular fondant sugar with the emulsifiable fat, it is advisable first to make a pre-mix of the fat with part of the required amount of fondant sugar, and only then to mix in the remainder of the fondant sugar.

Example 1

A suitable mixing apparatus is first charged with 300 kilograms of dry, granular fondant sugar, and then with 93.8 kilograms of liquid fat having a temperature of 60° C. The fondant sugar comprises 90% of saccharose, 8% of invert sugar and 2% of moisture, and has been obtained with the method of Belgian Pat. No. 548,498. The fat comprises palm kernel fat together with sunflower oil and an emulsifier and has a melting point of 37° C. The combination is blended for 10 minutes in order to obtain a pre-mix. Then 950 kilograms of dry, granular fondant sugar of the same composition as above are gradually added and mixed in until a white powdered fondant product has been obtained. This powdered product can be stored for long periods in dry condition.

One kilogram of this powdered fondant product is mixed with 120 grams of water at 30–35° C. to obtain a wet fondant paste having a smooth and creamy consistency. A sugar glaze, made from this paste by icing has the same lustre and the same taste as a sugar glaze made from freshly cooked fondant paste. When such a glaze is frozen to a temperature of −18° to −20° C. and thawed, it does not flow away during thawing.

Example 2

The method of Example 1 is repeated with the exception that 56.2 kilograms of powdered cocoa are added after mixing in the 950 kilograms of dry fondant sugar. The result is a chocolate-colored powdered fondant product which can be stored for long periods in dry condition.

One kilogram of this powdered fondant product is mixed with 130 grams of water at 30 to 35° C. to reach a wet fondant paste having a smooth and creamy consistency. A sugar glaze, made from this paste by icing, remains intact after freezing at −18° to −20° C. and thawing.

It will be understood by those skilled in the art that many variations to the above ingredients, amounts and processing steps may be made without going beyond the scope of the invention as defined in the appended claims.

What I claim is:

1. The method of producing a dry fondant product capable of admixture with liquid to form a sugar glaze which will not flow away incidental to thawing after having been frozen, which comprises the steps of:
   (a) forming an emulsifiable fat component which is a mixture of a hard fat with a liquid oil and emulsifier having a melting point of between 20 and 40° C.; and
   (b) bringing the temperature of the fat component above its melting point, thereby forming a liquid; and
   (c) blending the liquid fat component of step (b) with a dry, granular fondant sugar component for a time sufficient to produce the dry fondant product in which the dry fondant product contains from 5–10% of the liquid fat component based by weight upon the amount of sugar component;
   said dry fondant sugar component being obtained by providing a sugar solution which comprises, first concentrating such solution by cooking to reach a solids content of 90 to 95%; then admixing thereto 30 to 70% (calculated on total mixture) of finely divided sugar particles having for the major part a size not exceeding 40 microns; then breaking and cooling the mixture, and drying it during mixing, breaking and cooling to reach a moisture content of about 2% by weight.

2. The method as claimed in claim 1, wherein first a premix is made by blending said fat component in liquid state with part of the required amount of fondant sugar, and then the remainder of said fondant sugar is mixed in.

3. In the method according to claim 1 wherein said fat component consists of palm kernel fat with sunflower oil and an emulsifier and having a melting point of 37° C.

4. In the method according to claim 3 wherein said fondant sugar component consists of 90% saccharose, 8% invert sugars and 2% moisture.

5. In the method according to claim 1 wherein said fondant sugar component consists of 90% saccharose, 8% invert sugars and 2% moisture.

6. The method of producing a dry fondant product capable of admixture with liquid to form a sugar glaze which will not flow away incidental to thawing after having been frozen, comprising the steps of:
   (a) forming an emulsifiable fat component which is a mixture of a hard fat with a liquid oil and emulsifier having a melting point of between 20 and 40° C.;
   (b) bringing the temperature of the fat component above its melting point, thereby forming a liquid;
   (c) blending the liquid of step (b) with a minor amount of the dry, granular fondant sugar component for a time sufficient to form a pre-mix; and then
   (d) blending the pre-mix of step (b) with a major amount of the dry, granular fondant sugar component for a time sufficient to produce the dry, fondant product containing from 5–10% of the liquid emulsifiable fat component based upon the weight of the dry, granular fondant sugar;
   said dry, granular fondant sugar component being obtained by providing a sugar solution which comprises, first concentrating such solution by cooking to reach a solids content of 90 to 95%; then admixing thereto 30 to 70% (calculated on total mixture) of finely divided sugar particles having for the major part a size not exceeding 40 microns; then breaking and cooling the mixture, and drying it during mixing, breaking and cooling to reach a moisture content of about 2% by weight.

7. The method according to claim 6 wherein said dry, granular fondant sugar consists of 70–95% saccharose, 3–28% invert sugars and about 2% moisture.

8. The method according to claim 6 wherein said dry, granular fondant sugar consists of 70–95% saccharose, 3–28% invert sugars and about 2% moisture.

References Cited

UNITED STATES PATENTS

| | | | |
|---|---|---|---|
| 2,129,859 | 9/1938 | Miner | 99—134 G |
| 2,824,808 | 2/1958 | Gillett et al. | 99—134 G |
| 3,512,995 | 5/1970 | Reed et al. | 99—134 G |
| 3,698,917 | 10/1972 | Baum | 426—363 |

A. LOUIS MONACELL, Primary Examiner

J. M. HUNTER, Assistant Examiner

U.S. Cl. X.R.

426—201